UNITED STATES PATENT OFFICE.

WILLIAM O. GAYNOR, OF CHICAGO, ILLINOIS, ASSIGNOR TO MAX GOODMAN, OF CHICAGO, ILLINOIS.

REMOVING IMPREGNATING MATERIAL FROM PAPER.

1,284,647.  Specification of Letters Patent.  Patented Nov. 12, 1918.

No Drawing.   Application filed November 27, 1916. Serial No. 133,579.

*To all whom it may concern:*

Be it known that I, WILLIAM O. GAYNOR, citizen of the United States, residing at Chicago, in the county of Cook and State of Illinois, have invented certain new and useful Improvements in Removing Impregnating Material from Paper; and I do hereby declare the following to be a full, clear, and exact description of the invention, such as will enable others skilled in the art to which it appertains to make and use the same.

My invention relates to the reclaiming of both the paper and the wax from waxed paper, and to the economical reclaiming and repeated utilization of the intermediary agent used for removing the wax from the paper when cold. With the rapid increase in the use of paraffined and other waxed papers for food wrappers, drinking cups and other forms of wrappers or containers, the amount of such waxed papers left as trimmings or other forms of scrap has been growing rapidly. However, attempts to reclaim both the wax and the paper from this scrap have failed because of a number of reasons. Thus, while the application of heat to the waxed paper would melt the wax, only the surface wax could be removed in that way and any effort to remove a larger portion has resulted in reducing the paper to a pulp still containing a part of the wax. So also, attempts to remove the wax by solvents have not succeeded in dislodging the portion of the wax which filled the interstices of the paper, and hence have still left the partially dewaxed scrap in a condition in which it was not of value as a raw material for paper mills. Likewise, where aqueous solutions were tried, these have resulted in pulping the paper, thus spoiling the commercial value of the latter.

More particularly, my invention aims to loosen all of the wax from the paper (including that in the interstices of the paper) without reducing the paper to a pulp, to mingle the loosened wax while in suitable condition with a carrying liquid, to separate this mixture of the loosened wax with the wax carrying liquid from the paper (leaving the latter in fit condition for use as a paper pulp stock), and to reclaim both the wax and substantially all of the carrying liquid from the mixture so that this liquid may be used over and over again. Other objects will appear hereafter.

To illustrate one way of carrying out my invention, I introduce the paraffined or other wax-impregnated paper into a suitable receptacle and cover it with a liquid of the general order of gasolene, benzene, benzol or naphtha; that is to say, a liquid which will not readily dissolve the wax out of the paper when cold, but which is more volatile than the wax on the paper. Then, I heat the liquid to a temperature at least equal to the melting point of the wax on the paper, thereby also heating the wax through the agency of the liquid and melting this wax. The heating is preferably done by steam coils immersed in the liquid and this heating may be continued both as to time and as to the advancing temperature beyond the melting of the wax, so that the convection currents produced in the liquid will cause the molten wax to loosen its hold on the paper and to diffuse through the liquid. For this purpose, I preferably use a considerable excess of the gasolene or other carrying liquid, so that in treating paper having about 25 per cent. of paraffin, this paraffin will afterward represent only a few per cent. of the liquid mixture. By thus reducing the relative proportion of the wax, I obtain a liquid mixture in which the wax will no longer tend to stick to the paper while the mixture is hot. Consequently, upon drawing the mixture off from the receptacle while it is hot, I leave the paper practically free from its original wax content and just as well suited for future paper-making purposes as it would be if it had never been waxed. Then, by heating the drained liquid to the vaporizing point of its main constituent (the gasolene or the like), the latter can be recovered and used again for treating another batch of waxed paper, the only loss being that due to evaporation while returning the liquid to the receptacle in which the waxed paper is treated. Likewise, the wax left after the gasolene has been distilled off can be regained and again utilized for other purposes.

While the temperature required for the dewaxing of the paper will vary with the nature of the wax, it will commonly be below ordinary steam temperatures, and as any one of a large variety of heating appliances can be used for this purpose, I have not pictured any particular type. Neither do I wish to be limited to the details of procedure as above cited, since my process might be varied in many ways without departing from the spirit of my invention. For example, the liquid used may vary considerably as to its action while cold on the wax coating of the paper, and this action may or may not accelerate the loosening of the wax from the paper, since the choice of the liquid used may depend not only upon the speed of its effective action but also upon its cost and upon other factors, such as the fire risk involved by its use. So also, while my invention is particularly applicable to the separation of paraffin from paper, I do not wish to be limited to this application, since it might be equally suitable in connection with other coatings or impregnations and with fiber-pulps or the like as well as with paper.

I claim as my invention:

1. The process of removing a normally solid impregnating material from impregnated paper, consisting of immersing the impregnated paper in a liquid with which the impregnating material is freely miscible only when fused, directly and constantly heating the liquid surrounding the paper to a temperature sufficient to fuse the impregnating material and to cause the convection currents to agitate the paper and diffuse the impregnating material therein throughout the liquid, and then drawing off the liquid with the fused impregnating material in solution.

2. The process of removing a normally solid impregnating material from impregnated paper, consisting of immersing the impregnated paper in a non-flowing liquid with which the impregnating material is freely miscible only when fused, directly and constantly heating the liquid surrounding the paper to a temperature sufficient to fuse the impregnating material and to cause the convection currents to agitate the paper and diffuse the impregnating material therein throughout the liquid and then drawing off the liquid with the fused impregnating material in solution.

3. The process of removing a normally solid impregnating material from impregnated paper, consisting of immersing the impregnated paper in a liquid hydrocarbon with which the impregnating material is freely miscible only when fused, directly and constantly heating the liquid surrounding the paper to a temperature sufficient to fuse the impregnating material and to cause the convection currents to agitate the paper and diffuse the impregnating material therein throughout the liquid and then drawing off the liquid with the fused impregnating material in solution.

4. The process of removing and reclaiming a normally solid impregnating material from impregnated paper consisting of immersing the impregnated paper in a liquid with which the impregnating material is freely miscible only when fused, directly and constantly heating the liquid surrounding the paper to a temperature sufficient to fuse the impregnating material and to cause convection currents to agitate the paper and diffuse the impregnating material therein throughout the liquid, then drawing off the liquid with the fused impregnating material in solution, and then fractionally distilling the resulting liquid.

5. The process of removing wax from impregnated paper, consisting of immersing the paper in a liquid with which the wax is freely miscible only when fused, directly and constantly heating the liquid surrounding the paper to a temperature sufficient to fuse the wax and to cause convection currents to agitate the paper and diffuse the wax therein throughout the liquid, and then drawing off the liquid with the wax in solution.

6. The process of removing wax from impregnated paper, consisting of immersing the paper in a non-flowing liquid with which the wax is freely miscible only when fused, directly and constantly heating the liquid surrounding the paper to a temperature sufficient to fuse the wax and to cause convection currents to agitate the paper and diffuse the wax therein throughout the liquid and then drawing off the liquid with the wax in solution.

7. The process of removing wax from impregnated paper consisting of immersing the paper in a liquid hydrocarbon with which the wax is freely miscible only when fused, directly and constantly heating the liquid surrounding the paper to a temperature sufficient to fuse the wax and to cause convection currents to agitate the paper and diffuse the wax therein throughout the liquid, and then drawing off the liquid with the wax in solution.

8. The process of reclaiming wax from paper impregnated therewith, consisting of immersing the paper in a liquid with which the wax is freely miscible only when fused, directly and constantly heating the liquid surrounding the paper to a temperature sufficient to fuse the wax and to cause convection currents to agitate the paper and diffuse the wax therein throughout the liquid, then drawing off the liquid with the wax in solution, and then fractionally distilling the liquid to separate the wax from the other constituents thereof.

Signed at Chicago, Illinois, November 24th, 1916.

WILLIAM O. GAYNOR.